United States Patent [19]

Shelor

[11] Patent Number: 4,807,184

[45] Date of Patent: Feb. 21, 1989

[54] MODULAR MULTIPLE PROCESSOR ARCHITECTURE USING DISTRIBUTED CROSS-POINT SWITCH

[75] Inventor: Charles F. Shelor, Arlington, Tex.

[73] Assignee: LTV Aerospace, Dallas, Tex.

[21] Appl. No.: 895,239

[22] Filed: Aug. 11, 1986

[51] Int. Cl.[4] .................. G06F 13/00; G06F 13/14; G06F 13/18; G05B 15/08

[52] U.S. Cl. ..................... 364/900; 364/131; 364/134; 340/826; 340/825.79; 340/825.89

[58] Field of Search ... 364/200 MS File, 900 MS File, 364/131, 133, 136, 140; 340/826, 825.79, 825.89

[56] References Cited

U.S. PATENT DOCUMENTS

| | | | |
|---|---|---|---|
| 3,274,561 | 9/1966 | Hallman et al. | 364/200 |
| 3,648,252 | 3/1972 | Thron et al. | 364/200 |
| 3,761,879 | 9/1973 | Brandsma et al. | 364/200 |
| 4,093,828 | 6/1978 | Baudin | 340/825.86 |
| 4,096,571 | 6/1978 | Vander Mey | 364/200 |
| 4,099,233 | 7/1978 | Barbagelata et al. | 364/200 |
| 4,115,851 | 9/1978 | Nagano et al. | 364/200 |
| 4,149,238 | 4/1979 | James et al. | 364/200 |
| 4,195,344 | 3/1980 | Yamazaki | 364/200 |
| 4,365,292 | 12/1982 | Barnes et al. | 364/200 |
| 4,400,771 | 8/1983 | Suzuki et al. | 364/200 |
| 4,438,494 | 3/1984 | Budde et al. | 364/200 |
| 4,472,771 | 9/1984 | Bienvenu et al. | 364/200 |
| 4,539,564 | 9/1985 | Smithson | 340/825.79 |

Primary Examiner—Gareth D. Shaw
Assistant Examiner—Joseph T. Fitzgerald
Attorney, Agent, or Firm—Arnold, White & Durkee

[57] ABSTRACT

A modular switching system for connecting a plurality of digital computers to a plurality of computer memories, employing interconnecting digital switching modules. Each module has the capability of recognizing an access request to a computer memory by recognizing a generated address within a range of addresses assigned to that computer memory. The digital switching modules are interconnected with a priority network which permits arbitration between simultaneous requests for access by several digital computers to the same computer memory.

13 Claims, 4 Drawing Sheets

MODULAR MULTIPLE PROCESSOR ARCHITECTURE USING DISTRIBUTED CROSS-POINT SWITCH

BACKGROUND OF THE INVENTION

1. Field of the Invention

The present invention generally relates to computer systems employing multiple processors and multiple computer memories with means for interconnecting the processors and memories. More particularly, the present invention relates to an apparatus and method for interconnecting multiple digital computers with multiple computer memories according to a hierarchy of priorities among said computers.

2. Description of the Related Art

Modern computer systems typically employ a plurality of digital computers which execute a software operating system for distributing program tasks among the digital computers. One means for communication between the various computers is the allocation of a common memory area accessible by two or more of the computers. Also, task sharing between the computers requires that the same memory file be processed by two or more computers. This memory file must therefore lie in a common area of memory to permit access by several computers.

Many modern computer systems employ a modular architecture. Standard modules such as processor units, memory units, and input/output units are connected as required to provide the computing capability required for a given system. A wide variety of computer systems may thus be constructed using these standard modules. Also, a particular computer system employing a modular architecture can grow in an orderly fashion by the addition of standard modules as required when increased processing capability is needed.

Several types of computer architecture have been employed in modern computer systems, as are more particularly described later herein. Examples of these configurations are: pipeline, global memory, local/global memory and mesh. Each type of configuration has its particular advantages and disadvantages for certain types of information processing. In general, system building blocks or modules suitable for implementing one type of configuration are frequently not suitable for implementing another. Ideal computer system modules are equally adaptable to the implementation of several types of computer architecture.

SUMMARY OF THE INVENTION

A computer architecture according to the present invention employs a modular switching system suitable for connecting a plurality of digital computers to a plurality of computer memories in a virtually unlimited number of ways as required for a particular information processing application. Switching modules according to the present invention may be used as building blocks to construct the switching system to conform to the needs of a particular application.

According to the present invention, a modular switching system for connecting a plurality of digital computers to a plurality of computer memories comprises a plurality of interconnected switching modules. Each of these switching modules comprises means for connecting one of the digital computers to one of the computer memories, as well as means for arbitrating between simultaneous attempts by several digital computers to access the same memory.

According to a more particular aspect of the present invention, several digital computers, each acting through a separate switching module, may gain access to a particular computer memory by generating an address within a range of addresses assigned to that computer memory. Several digital switching modules provide a path to the same computer memory and are interconnected in a priority network whereby the respective digital computers are assigned a priority level. Interconnection between the several switching modules establishes a hardware waiting queue on which requirements to access the computer memory are placed as they occur and are serviced and removed from the queue according to the priority level assigned to the digital computer making the request.

Additionally, according to the present invention, a method for interconnecting a plurality of digital computers to a plurality of computer memories comprises assigning a priority level to each of the digital computers, establishing a waiting queue for access requests made to each computer memory, placing requests for access to the computer memory on the queue, and servicing the requests on the queue according to the priority level assigned to the digital computer making the request.

BRIEF DESCRIPTION OF THE DRAWINGS

The detailed description of the present invention is better understood with reference to the following drawings.

DESCRIPTION OF A PREFERRED EMBODIMENT

The modular system disclosed herein is adaptable to a virtually unlimited number of different types of computer system configurations. The present invention may be used to implement some of the more common computer system configurations, an example of which will be more particularly described below. However, a better understanding of the present invention may be gained from its use in implementing a full cross-point computer-to-memory connection.

Figure 1:
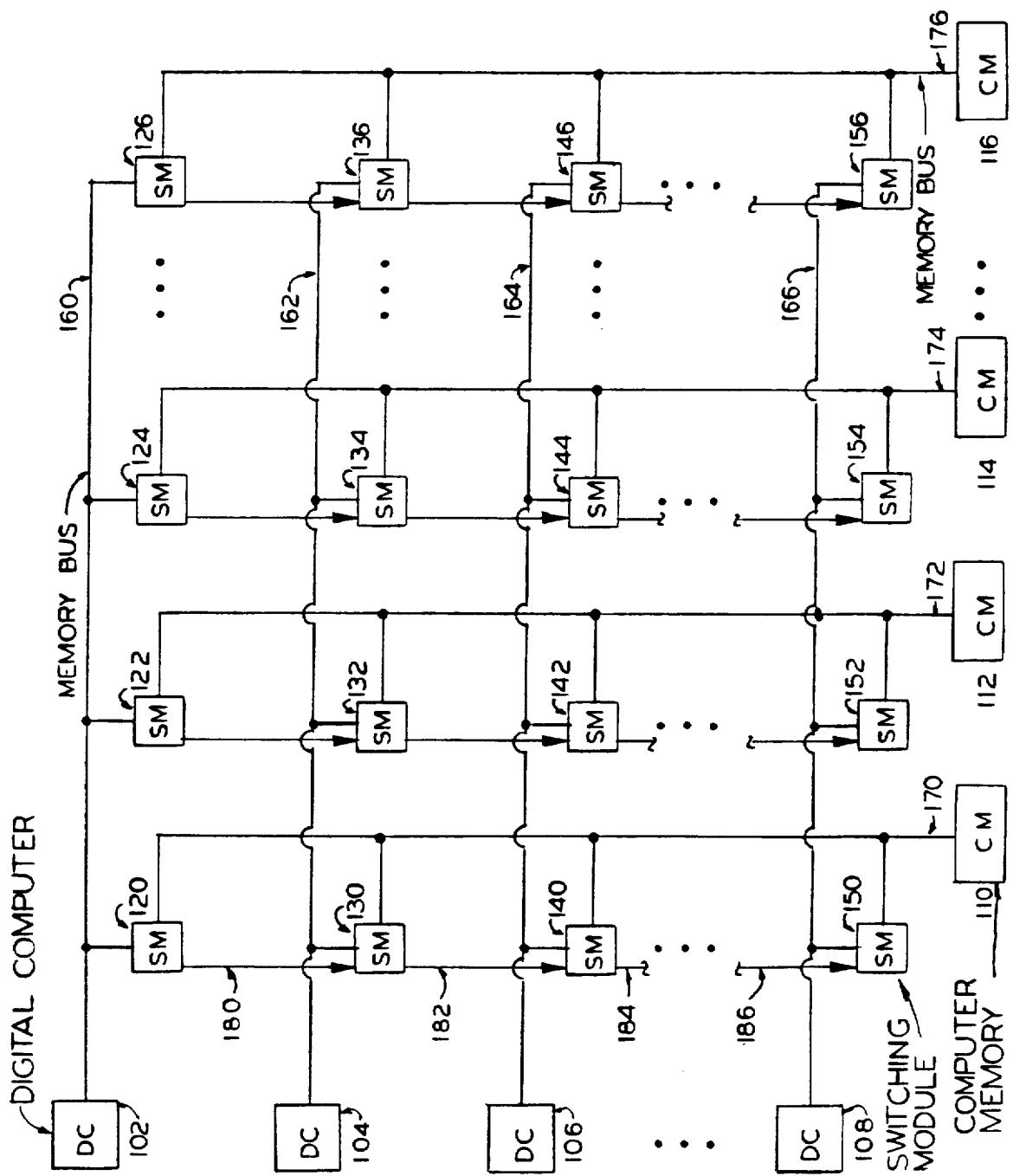
FIG. 1 shows an embodiment of the present invention wherein each of a plurality of digital computers may access each of a plurality of computer memories through a modular switching system implemented with a plurality of switching modules.

Referring now to FIG. 1, a modular switching system 100 according to the present invention is employed to connect m digital computers to r computer memories, where m and n are positive integers. Shown are four digital computers, 102, 104, 106, and 108, with dots to indicate that any number of additional digital computers may be added. Four computer memories, 110, 112, 114, and 116 are shown. Dots are added to FIG. 1 to indicate that any number of additional computer memories may also be added.

Digital computer 102 is adapted to transmit and receive digital information on a memory-bus 160. Four switching modules 120, 122, 124, and 126 are shown connected to the memory-bus 160. Although only four switching modules are shown connected to the memory-bus 160, there will be a total of n switching modules connected thereto, one for each of the computer memories. In a similar manner, the digital computer 104 is connected to a memory-bus 162 for communication with switching modules, 130, 132, 134, and 136. The digital computer 106 communicates on a memory-bus 164 with switching modules 140, 142, 144, and 146. The digital computer 108 communicates on a memory-bus 166 with switching modules 150, 152, 154, and 146. As can be readily seen from FIG. 1, a total of m x n switching modules is required to connect m digital computers to n computer memories.

The switching modules 120, 130, 140, and 150 are connected on a memory-bus 170 to communicate with the computer memory 110. Similarly, switching modules 122, 132, 142, and 152 communicate on a memory-bus 172 with the computer memory 112. The switching modules 124, 134, 144, and 154 communicate on a memory-bus 174 with the computer memory 114. The switching modules 126, 136, 146, and 156 communicate on a memory-bus 176 with the computer memory 116.

The switching modules connected to the memory-bus 170 are seen in FIG. 1 to be themselves interconnected in a priority network. The switching modules connected to the memory-buses 172, 174, and 176 are each interconnected in a similar manner. The priority networks provide a means for arbitration of simultaneous access attempts by two or more of the digital computers directed to the same computer memory. The function of the priority network for the switching modules connected to the memory-bus 170 will be described with the understanding that the priority networks of the other switching modules function in a similar manner.

The switching module 120 is connected by a priority bus 180 to the switching module 130. In a similar fashion, the switching module 130 is connected by a priority bus 182 to the switching module 140. As has been previously described, any number of switching modules, one for each digital computer, will be connected to the memory-bus 170. Thus, a priority bus 184 coming from the switching module 140 is connected to the next switching module in the chain. A priority bus 186 is seen coming from the next to last switching module in the chain and entering the switching module 150. For ease of understanding the present invention, it may be assumed that the priority bus 184 is connected directly to the priority bus 186, although it will be understood that any number of switching modules may actually be connected between the switching module 140 and the switching module 150.

The m digital computers are thus arranged in a natural hierarchy with the digital computer 102 having the highest priority The digital computer 108 is thus seen to have the lowest priority The various computers in between, including the computer 104 and the computer 106 will each have a priority dependent upon the placement of its corresponding switching module in the chain of priority buses. Although computer 102 is shown in this switching system 100 as the source for each of the memory buses 170, 172, 174, and 176, any of the computers 102, 104, 106, 108 can be the highest priority for any memory bus, and the computers can be assigned different priorities in different orders on each memory bus.

Each of the m digital computers operates independently of the other in the execution of instructions and the accessing of the n computer memories for storage and retrieval of information. Each of the m digital computers in the configuration of FIG. 1 has a path through a switching module to each of the n computer memories. Consequently, it is possible for two or more of the m digital computers to attempt to access the same computer memory for the storage or retrieval of information.

If two of the m digital computers, say the computers 104 and 106, attempt to access the memory 110 at the same time, the priority network now to be described will become operable to arbitrate these simultaneous accesses. Because of their relative positions in the priority network, the computer 104 has a higher priority than the computer 106. The computer 104 and the computer 106 will signal their respective attempts to access the computer memory 110 by generating an address within a range of addresses assigned to the computer memory 110. Each of the n computer memories has a range of addresses assigned to it, with no two address ranges containing the same address.

The switching module 130 will sense that the address generated by the computer 104 is within the range of addresses assigned to the computer memory 110, by a means to be explained later. Thus, the switching module 130 transmits a disable signal on the bus 182. Since in this example the computer 102 is not currently generating an address within the range of addresses assigned to the computer memory 110, the switching module 120 will maintain an enable signal on the bus 180. The switching module 130 will thus determine (1) that no digital computer with a priority higher than the computer 104 is attempting to address the computer memory 110, and (2) its digital computer, the computer 104, seeks to access the computer memory 110. Thus, the switching module 130 will form a path for data storage and/or retrieval to the computer memory 110.

The switching module 140 will decline to form a path between the computer 106 and the computer memory 110 because it has received a disable signal on the bus 182. It will pass this disable signal on the bus 184 to all switching modules below it in priority. The switching module 150, at the bottom of the priority chain, will similarly receive a disable signal on the bus 186. Thus, only the access requests from highest priority computer seeking to access the memory 110, in this case the computer 104, will be allowed.

The computer 106 continues to assert its attempt to access a computer memory 110 until the computer 104 has finished accessing the computer memory 110. When the access by the computer 104 to the computer memory 110 is complete, the switching modules 130 will place an enable signal on the bus 182. At that time, the switching module 140 will be allowed to complete the access asserted by the computer 106 to the computer memory 110.

The priority resolution is performed at the completion of each memory cycle. The switching module with the highest priority is then granted access, not necessarily the switching module that first requested access. For example, if, during the time that the computer 104 is connected to the memory 110 through the switching module 130, a higher priority computer, for example the computer 102, attempts to access the memory 110 through the switching module 120, while the computer 106 is still waiting to access memory 110, then the switching module 120 will place a disable signal on the bus 180 which will propagate through the hierarchy of priority buses. Both the switching module 120 and the switching module 130 recognize that a memory cycle is in progress. Therefore, the switching module 130 continues the path between the computer 104 and the memory 110. The switching module 120 will wait until the current memory cycle is completed and will then form a path between the computer 102 and the memory 110. Since the switching module 140 is of lower priority than switching module 120, computer 106 will be denied access until computer 102 is finished.

The priority network interconnection of the switching modules connected to the bus 170 is thus seen to provide a hardware queue. Each of the m digital computers may assert an access to the computer memory 110 independently, and in some cases, simultaneously. Thus, access attempts are placed on the queue simply in their order of occurrence, but are serviced according to the priority level assigned to each digital computer asserting an access.

Figure 2:
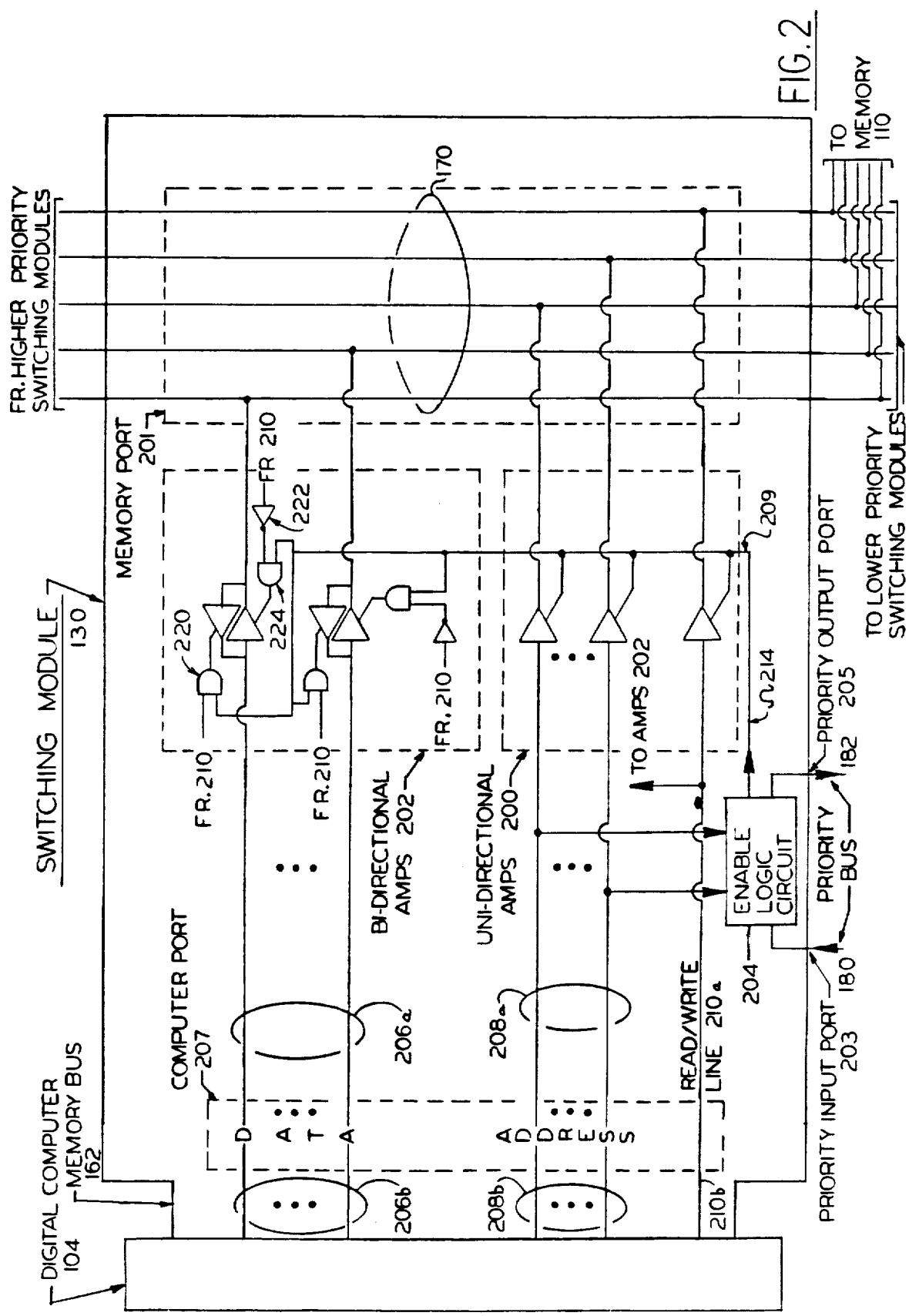
FIG. 2 shows one of the switching modules of FIG. 1 in greater detail.

Referring now to FIG. 2, a more detailed description of a preferred embodiment of a switching module is shown, using the switching module 130 as an example. It is to be understood that the detailed description of the switching module 130 in FIG. 2 is illustrative of all of the switching modules as shown in FIG. 1. The switching module 130 comprises a plurality of uni-directional three-state bus-drive amplifiers 200, a memory port 201, a plurality of bi-directional three-state bus-drive amplifiers 202, a priority input port 203, an enable logic 204, a priority output port 205, a group of data lines 206a, a computer port 207, a group of address lines 208a, a driver enable line 209, and a control line 210a. It would be obvious to one of ordinary skill in the art that the entire switching module 130 could be constructed on a single silicon chip, thus saving space.

The priority input port 203 is switchable. That is, the port 203 may be switched to connect to ground or to the output port 205 of any other switching module 130. In that way, the user may quickly change the priority assignments of the computers without rewiring. Since the enable logic 204 is "active low", when the input port 203 is switched to connect to ground, the output of the enable logic 204 is always "ENABLE". Thus, by merely switching the priority input port 203 to ground, that switching module becomes the module with the highest priority.

The memory-bus 162 connecting the computer 104 to the computer port 207 of the switching module 130 is divided into three groups of conductors or lines. A group of data lines 206b coupled to the port 207 to connect to the data lines 206a, conduct data between the digital computer 104 and the memory 110. In computer memories which are byte addressable, the data lines 206 would typically comprise eight data lines and a parity line. It should be understood, however, that any number of data lines may be included as required.

A second group of conductors coupled to the port 207 of the module 130 to connect to the address lines 208a is a group of address lines 208b which carries a binary encoded address which is used to select a particular memory location in the memory 110. The actual number of address lines 208 required will be determined by the number of addressable memory locations in the memory 110. Employing r address lines 208 will permit the selection of one out of $2^r$ addressable locations within the memory 110.

A third conductor coupled to the port 207, to connect to the control line 210a of the switching module 130, is a line 210b. The switching module 130 is responsive to a voltage "high" pulse (e.g., 0.5 volts) and a voltage "low" pulse on line 210b from the digital computer 104 to retrieve or store, respectively, information within the memory 110. It should be understood that additional control signals may be required for certain types of computer memories and/or certain types of digital computers and that the inclusion of only two memory control signals is merely representative.

The address lines 208a and the control lines 210a are coupled to the plurality of three-state bus drive amplifiers 200. In a manner later to be described, the drive amplifiers 200 have output nodes capable of assuming a logic 0 state, a logic 1 state, and a high impedance state. Drive amplifiers of this type are well known to those in the electronic art as suitable for use in memory-buses like that of the memory-bus 170 wherein outputs of many drive amplifiers may be connected. In the preferred embodiment, a Texas Instruments Model No. SN74LS244, a 20-pin integrated circuit, is used, which functions as eight of the amplifiers 200.

The respective output nodes of the drive amplifiers 200 are connected to output nodes of corresponding drive amplifiers in other switch modules connected to the memory-bus 170. For example, assume that there are r address lines going to the computer memory, and that these address lines are denoted "bit 0", "bit 1", . . . , "bit r-1". Each of the "bit 0" lines from each of the switching modules connected to the bus 170 will be tied together, each of the "bit 1" lines will be tied together, and so on. In a similar manner, corresponding data lines carrying data to the memory 110 are tied together.

The amplifiers 200 and 202 function as a connection means for connecting the computer port 207 to the memory port 201, in response to a driver enable signal, or priority signal, 214, on the driver enable line 209. The driver enable signal 214 on the driver enable line 209 will switch the outputs of the drive amplifiers 200 out of the high impedance state at a time when information from the computer 104 is to be placed on the memory-bus 170. Simultaneously, the corresponding drive amplifiers in all other switching modules connected to the memory-bus 170 will be forced to their high impedance state, in a manner to be explained later, and will therefore not permit data to be impressed on the memory-bus 170 from other digital computers.

The signal 214, which enables the output of the drive amplifiers 200, also is transmitted to the plurality of bi-directional three-state bus-drive amplifiers 202 which are equivalent in function to the drive amplifiers 200, except that the amplifiers 202 allow a flow of information in both directions between the memory 110 and the computer 104. In the preferred embodiment, a model SN74LS245, a 20-pin integrated circuit, manufactured by Texas Instruments, is used for eight of the bi-directional amplifiers 202. The digital computer 104 will expect to receive data on the data lines 206b, responsive to a voltage "high" signal the computer places on the read/write line 210b, which is coupled to the read/write line 210a by the computer port 207. When a voltage "high" pulse appears on the enable line 209, and on the line 210 (a "READ" pulse when on line 210), an AND gate 220, which is part of the 20-pin integrated circuit comprising eight bi-directional amplifiers, enables the amplifiers 202 to receive data from the memory port 201 and transmit it to the computer port 207. Similarly, when a voltage "low" pulse appears on line 210 ("WRITE" pulse), and a voltage "high" pulse appears on the enable line 209, an inverter 222 and an AND gate 224, also part of the 20-pin integrated circuit, function to enable the amplifiers 202 the computer port 207 and transmit it to the memory port 201.

The enable logic 204 is both an address comparator means and a means for producing a priority signal. The enable logic 204 is programmed to determine whether an address on the address lines 208 falls within a range of addresses assigned to the memory 110. This can be accomplished with several methods known to those skilled in the art. The preferred method is the comparison of the signals on a selected quantity of address lines, commonly referred to as upper, higher order, or most significant lines, to a predefined value. If the comparison yields equality, then the address is within the assigned range. Otherwise, the address is outside the assigned range. The predefined comparison value can be established as a constant via wiring during manufacturing, a switchable constant which is set during installation, or written into a hardware latch during system initialization. If the enable logic 204 determines that the address on the address lines 208 falls within this range and if the enable logic 204 receives an enable signal on the priority bus 180, the enable logic 204 generates a priority signal 214 on the line 209 to enable the unidirectional drive amplifiers 200 and the bi-directional drive amplifiers 202. Also, the enable logic 204 at the same time generates a disable signal on the priority bus 182.

The enable logic 204 also generates a disable signal on the priority bus 182 when a disable signal is received on the priority bus 180. The enable logic 204 will receive a disable signal on the priority bus 180 if a digital computer having a higher priority than the computer 104 is currently accessing the memory 110. The enable logic 204 will place an enable signal on the priority bus 182 only when an enable signal is received on the priority bus 180 and the computer 104 is not attempting to access the memory 110.

Figure 3:
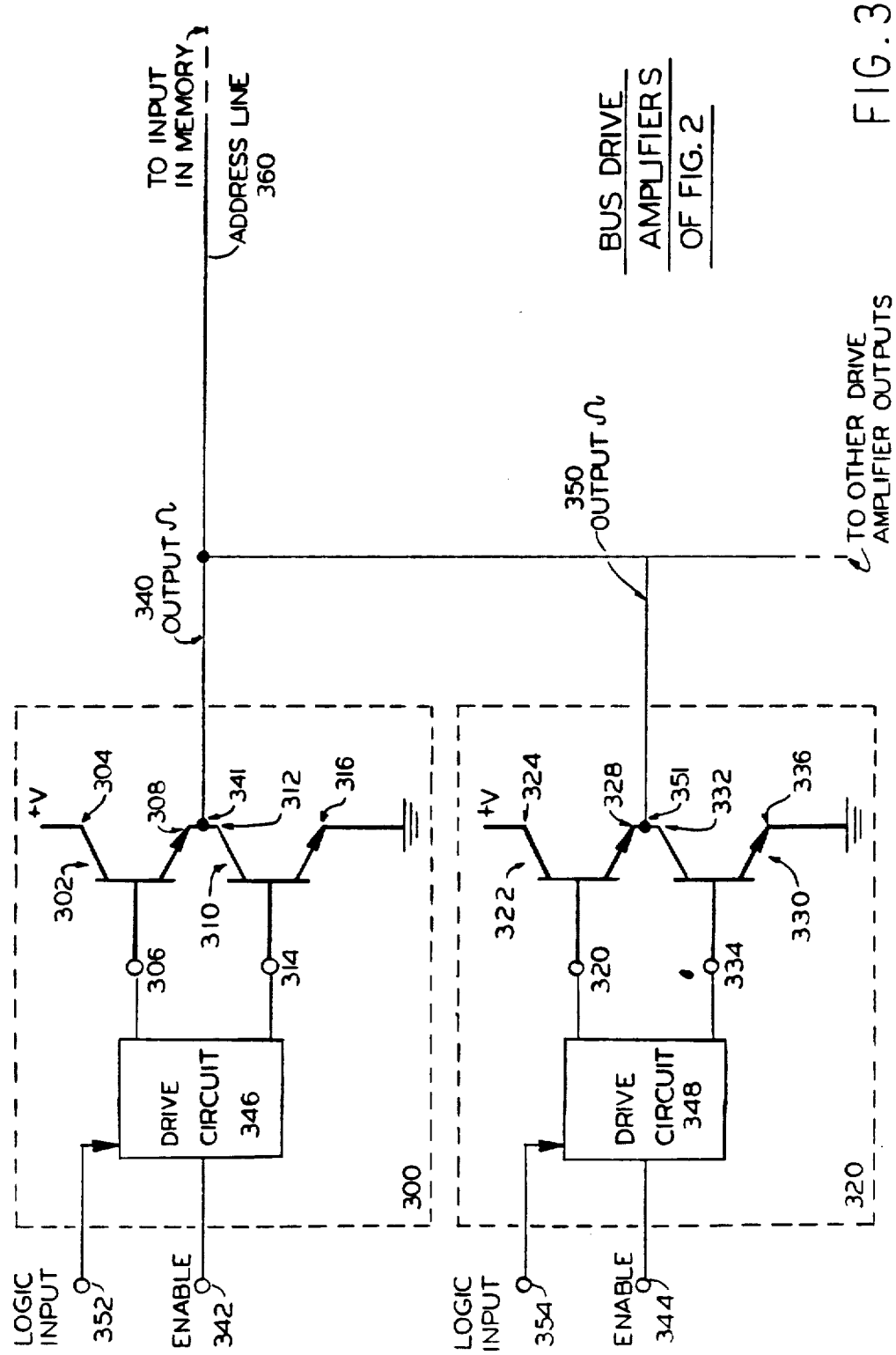
FIG. 3 shows an embodiment of the bus drive amplifiers of FIG. 2 as they are connected to create a three state bus.

Referring now to FIG. 3, a pair of bus drive amplifiers 300 and 320 are shown with their respective outputs connected together to form one of the signal lines for transmitting data and addresses to one of the computer memories shown in FIG. 1. The amplifiers 300 and 320 are representative of the collection of drive amplifiers 200 and 202 in FIG. 2.

The amplifier 300 is in a different switching module from that containing the amplifier 320. Their respective output nodes are connected to the same memory-bus. For clarity, it may be assumed that the amplifier 300 is contained in the switching module 120 and the amplifier 320 is contained in the switching module 130 (see FIG. 1). The output nodes of the amplifiers 300 and 320 may further be assumed to be connected to an address signal line 360 of the memory-bus 170. However, it should be understood that the amplifiers 300 and 320 are merely representative of each of the drive amplifiers in each of the switching modules which transmit addresses and data to each of the computer memories.

The amplifier 300 comprises a drive circuit 346, which receives an enable signal at an input 342, and a pair of transistors 302 and 310, which transistors generate a three-state output 340, at an output node 341. The amplifier 320 is comprised of a similar drive circuit 348, which receives an enable signal at an input 344, and a pair of transistors 322 and 330, which transistors generate a three-state output 350 at an output node 351. In response to an enable signal transmitted to the enable input 342, the drive circuit 346 will allow a logic signal at the logic input 352 to be generated as the output 340. In a similar manner, in response to an enable signal transmitted to the enable input 344, the drive circuit 348 will allow a logic signal at the logic input 354 to be generated as the output 350.

The output nodes 341 and 351 may assume one of three different states: a logic 0 state, a logic 1 state, or a high impedance state. The output nodes 341 and 351, together with other output nodes from other drive amplifiers, are connected to the address signal line 360 of the memory-bus 170. Only one of the various drive amplifier output nodes so connected will be in other than the high impedance state at any time. When none of the digital computers are communicating with the memory 110 over the memory-bus 170, all of the output nodes so connected will be in the high impedance state.

The transistors 302 and 310 of the amplifier 300 are connected in a configuration known to those skilled in the electronic art as a "totem pole" configuration. A collector 304 of the transistor 302 is connected to a source of positive voltage denoted +V. The transistor 302 has an emitter 308 connected to a collector 312 of the transistor 310. The transistor 310 has an emitter 316 connected to the ground or common point of the circuit. The pair of transistors 322 and 330 of the amplifier 320 are connected in a similar manner.

The transistor 302 conducts current from the collector 304 to the emitter 308 when current is provided or supplied to a base 306 of the transistor. Similarly, the transistor 310 conducts current from the collector 312 to the emitter 316 when current is provided to a base 314 of the transistor. If no current is supplied to the base 306 while current is supplied to the base 314, the output 340 is a logic 0 signal. Alternatively, if current is supplied to the base 306 while no current is supplied to the base 314, the output 340 is a logic 1 signal. If neither of the bases 306 and 314 receive current, the output 340 assumes a high impedance state. It will be obvious to those skilled in the electronic art that the corresponding parts of the drive amplifier 320 will function in a similar manner to produce the three possible states at the output node 351.

Thus, for example, if the switching module containing the amplifier 300 is communicating with the memory 110 on the address line 360 of the memory-bus 170, the output node 351 of the amplifier 320, as well as all the other drive amplifier output nodes connected to the address line 360, will be in the high impedance state so as not to interfere with the communication.

The configuration of FIG. 1 provides a communication path from each of the r digital computers to each of the n computer memories. Many computer systems used in practice may not require this complete connection. In such a case, one or more of the switching modules may be removed. By removing selected switching modules, the more familiar types of interconnections between multiple computers and multiple memories may be created.

Figure 4:
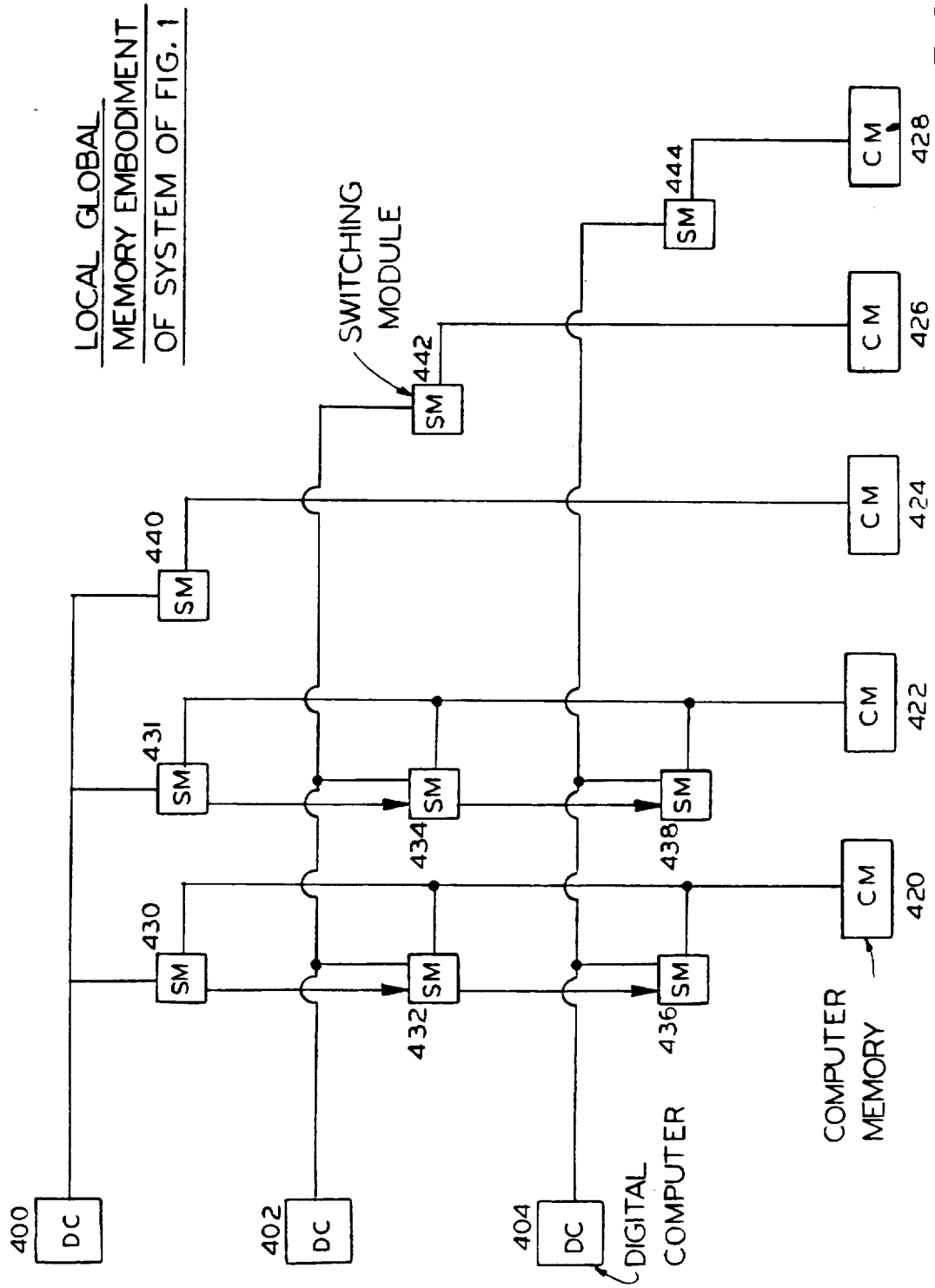
FIG. 4 shows a local/global memory embodiment of the present invention derived from the configuration of FIG. 1.

Referring now to FIG. 4, a local/global memory configuration is implemented using the present invention. Three digital computers 400, 402, and 404 each have access to a global memory comprising a pair of computer memories 420 and 422. Three switching modules 430, 432, and 436 are operable to provide access for the digital computers 400, 402, and 404 to the computer memory 420. Three switching modules 431, 434, and 438 are operable to provide access by the digital computers 400, 402, and 404 to the computer memory 422.

Three computer memories 424, 426, and 428 serve as local memories for the digital computers 400, 402, and 404, respectively. The computer 400 has access to the memory 424 through a switching module 440. The computer 402 has access to the memory 426 through a switching module 442. The computer 404 has access to the memory 428 through a switching module 444.

It will be clear to those skilled in the electronic arts that the configuration of FIG. 4 may be created from a configuration like that of FIG. 1 by appropriate removal of switching modules. It will be equally apparent that selective removal of switching modules from a completely connected system like that of FIG. 1 will allow the computer systems architect to create a virtually unlimited number of different configurations. Similarly, it may easily be seen that sparsely connected systems such as that of FIG. 4 may be modified by the addition of switching modules to provide additional paths between computers an memories as required.

Those skilled in the relevant art will recognize that the embodiments of the present invention are only exemplary. For example, FIG. 3 depicts an implementation of three-state memory-bus drive amplifiers 300 and 320 using bipolar junction transistors, while other types of semiconductor devices such as metal-oxide-silicon (MOS) field effect transistors may be used. The present invention therefore is limited only by the following claims.

What is claimed is:

1. A modular switching system for connecting a plurality of digital computers to a plurality of computer memories, the system comprising:
   (a) a plurality of switching modules;
   (b) groups of the plurality of switching modules conductively coupled to each give digital computer of the plurality of digital computers for data transmission, each switching module of each group of switching modules conductively coupled to a different one of the computer memories for data transmission;
   (c) each switching module including means, responsive to the transmission of a memory address by its respective digital computer of the plurality of digital computers within a range of memory addresses assigned to the computer memories, for forming a path for data storage and retrieval between its respective digital computer and a given one of the computer memories; and
   (d) the switching modules operable in combination to arbitrate simultaneous attempts by two or more of the digital computers to access one of the computer memories.

2. The modular switching system according to claim 1, wherein each switching module further comprises:
   (a) a first port for receiving data and addresses from one of the digital computers, and for transmitting data thereto;
   (b) a second port for transmitting addresses and data to one of the computer memories, and for receiving data therefrom;
   (c) means for determining when an address sent by a given one of the digital computers is within a range of addresses assigned to the given one memory; and
   (d) means for connecting the first port to the second port when the address is within the range.

3. The modular switching system according to claim 2, wherein said means for connecting comprises a plurality of three-state devices.

4. The modular switching system according to claim 2 wherein said switching module further comprises:
   (a) a priority signal output port; and
   (b) means, responsive to an attempt by said given digital computer to access said given computer memory, for generating a priority signal at said priority signal output port.

5. The modular switching system of claim 2 wherein the switching modules are the only means for arbitrating simultaneous attempts by two or more of the digital computers to access one of the computer memories.

6. The modular switching system of claim 1 wherein the switching modules are the only means for arbitrating simultaneous attempts by two or more of the digital computers to access one of the computer memories.

7. A modular switching system for connecting each separate one of m digital computers to a separate one of n computer memories, where m and n are positive integers, the system comprising:
   (1) m x n switching modules arranged in n groups of m switching modules each, wherein for each separate one of the n computer memories, a group of m switching modules is conductively coupled for data transmission to the separate one of the n computer memories, each switching module in the group of switching modules conductively coupled for data transmission to a separate one of the m digital computers;
   (2) each module comprising:
      (a) a first port for receiving data and addresses from the given digital computer and for transmitting data to the given digital computer;
      (b) a second port connected to the given computer memory for data access and retrieval;
      (c) address comparator means coupled to the first port, for determining when an address received from the given digital computer is within a range of addresses assigned to the given computer memory and for producing an output signal when the address is within the range;
      (d) priority arbitration means, comprising:
         (i) a priority input port;
         (ii) priority signal means, coupled to the priority input port and coupled to the address comparator means, the priority signal means responsive to a signal received at the priority input port and responsive to the output signal produced by the address comparator means, for producing a priority signal;
         (iii) a priority output port, coupled to the priority signal means, for transmitting the priority signal, and
      (e) connection means for connecting the first port to the second port responsive to the priority signal;
   (3) the switching modules in each of the n groups connected for data transmission in a descending order of assigned priority whereby the priority output port of a higher priority switching module is connected to the priority input port of the switching module with the next lower assigned priority.

8. The modular switching system according to claim 7, wherein for a first switching module the priority signal produced at the priority output port is a binary valued signal which assumes a first signal state to enable a second switching module with the next lower assigned priority than the first module, and wherein the priority signal assumes a second signal state to disable the second switching module.

9. The modular switching system according to claim 8, wherein for the first switching module, the priority signal produced at the priority output port:

(a) assumes the first signal state after receiving a priority signal of the first state from a higher assigned priority switching module at the priority input port, when the address comparator means has not determined that an address received at the first port is within the range of addresses, and (b) assumes the second signal state at all other times.

10. The modular switching system according to claim 7, wherein the connection means comprises a plurality of output nodes, each output node operable to assume a logic 1 state, a logic 0 state, and a high impedance state.

11. The modular switching system according to claim 10, wherein each second port has a plurality of output nodes and corresponding output nodes of the second ports of each switching module are connected to corresponding output nodes of the connection means and are operable for assuming a plurality of logic state, whereby at any time only one of the output nodes of the second port may assume a state other than the high impedance state.

12. The modular switching system of claim 7 wherein the switching modules are the only means for arbitrating simultaneous attempts by two or more of the digital computers to access one of the computer memories.

13. A modular switching system for selectively connecting a first and a second digital computer to a first and a second computer memory in which the first computer has priority over the second computer, the system comprising:

(a) a first switching module conductively coupled to the first computer and conductively coupled to the first memory, and operable in response to an address signal from the first computer to connect the first computer to the first memory;

(b) a second switching module conductively coupled to the first computer and conductively coupled to the second memory, and operable in response to an address signal from the first computer to connect the first computer to the second memory;

(c) a third switching module conductively coupled to the second computer and conductively coupled to the first memory, and conductively coupled to the first switching module, and operable in response to an address signal from the second computer to connect the second computer to the first memory;

(d) a fourth switching module conductively coupled to the second computer and conductively coupled to the second memory, and conductively coupled to the second switching module, and operable in response to an address signal from the second computer to connect the second computer to the second memory;

(e) the third switching module including means responsive to a signal from the first switching module indicating connection of the first computer to the first memory to disable to the third switching module from connecting the second computer to the first memory pending connection of the first computer to the first memory; and (f) the fourth switching module including means responsive to a signal from the second switching module indicating connection of the first computer to the second memory to disable the fourth switching module from connecting the second computer to the second memory pending connection of the first computer to the second memory.

* * * * *

UNITED STATES PATENT AND TRADEMARK OFFICE
CERTIFICATE OF CORRECTION

PATENT NO. : 4,807,184
DATED : February 21, 1989
INVENTOR(S) : Charles F. Shelor It is certified that error appears in the above-identified patent and that said Letters Patent is hereby corrected as shown below:

Column 3, line 56, after "priority", insert -- . --.

Column 3, line 57, after "priority", insert -- . --.

Column 8, line 54, delete "r digital computers" and insert --m digital computers--.

Column 9, line 38, delete "give" and insert --given--.

Column 11, line 26, delete "state" and insert --states--.

Column 12, line 27, after "disable", delete "to".

Signed and Sealed this

Fifteenth Day of August, 1989

Attest:

DONALD J. QUIGG

*Attesting Officer*   *Commissioner of Patents and Trademarks*